(12) United States Patent
Rose et al.

(10) Patent No.: US 12,450,031 B2
(45) Date of Patent: Oct. 21, 2025

(54) ITERATIVE ESTIMATION HARDWARE

(71) Applicant: Imagination Technologies Limited, Kings Langley (GB)

(72) Inventors: Thomas Rose, Watford (GB); Max Freiburghaus, London (GB); Robert McKemey, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 197 days.

(21) Appl. No.: 17/881,386

(22) Filed: Aug. 4, 2022

(65) Prior Publication Data
US 2022/0391205 A1  Dec. 8, 2022

Related U.S. Application Data

(63) Continuation of application No. 16/725,378, filed on Dec. 23, 2019, now Pat. No. 11,422,802.

(30) Foreign Application Priority Data

Dec. 21, 2018 (GB) ..................................... 1821179

(51) Int. Cl.
*G06F 7/552* (2006.01)
*G06F 7/57* (2006.01)

(52) U.S. Cl.
CPC .............. *G06F 7/5525* (2013.01); *G06F 7/57* (2013.01); *G06F 2207/5521* (2013.01)

(58) Field of Classification Search
CPC ........... G06F 7/5525; G06F 2207/5521; G06F 2207/5526–5528; G06F 7/544–575
See application file for complete search history.

(56) References Cited

U.S. PATENT DOCUMENTS

| | | |
|---|---|---|
| 5,253,215 A | 10/1993 | Lindsley |
| 5,386,375 A | 1/1995 | Smith |
| 5,847,979 A | 12/1998 | Wong et al. |

(Continued)

FOREIGN PATENT DOCUMENTS

CN          105045559 A      11/2015

OTHER PUBLICATIONS

High Order Algorithms to Find Square Roots and Inverses, numbers.computation.free.fr/Constants/Algorithms/Inverse.html, 2000.
(Continued)

*Primary Examiner* — Andrew Caldwell
*Assistant Examiner* — Huy Duong
(74) *Attorney, Agent, or Firm* — Potomac Law Group, PLLC; Vincent M DeLuca

(57) ABSTRACT

A function estimation hardware logic unit may be implemented as part of an execution pipeline in a processor. The function estimation hardware logic unit is arranged to calculate, in hardware logic, an improved estimate of a function of an input value, d, where the function is given by $$1/\sqrt[i]{d}.$$

The hardware logic comprises a plurality of multipliers and adders arranged to implement a $m^{th}$-order polynomial with coefficients that are rational numbers, where m is not equal to two and in various examples m is not equal to a power of two. In various examples i=1, i=2 or i=3. In various examples m=3.

11 Claims, 8 Drawing Sheets

(56) References Cited

U.S. PATENT DOCUMENTS

| | | | |
|---|---|---|---|
| 6,115,733 | A | 9/2000 | Oberman et al. |
| 6,163,791 | A | 12/2000 | Schmookler et al. |
| 2016/0299743 | A1 | 10/2016 | Fenney |
| 2017/0308355 | A1 | 10/2017 | Drane |

OTHER PUBLICATIONS

Habegger, "An Efficient Hardware Implementation for a Reciprocal Unit," www.researchgate.net/publication/220804890_An_Efficient_Hardware_Implementation_for_a_Reciprocal_Unit; researchgate.net 2010.
(Note: NPL documents in parent apn).

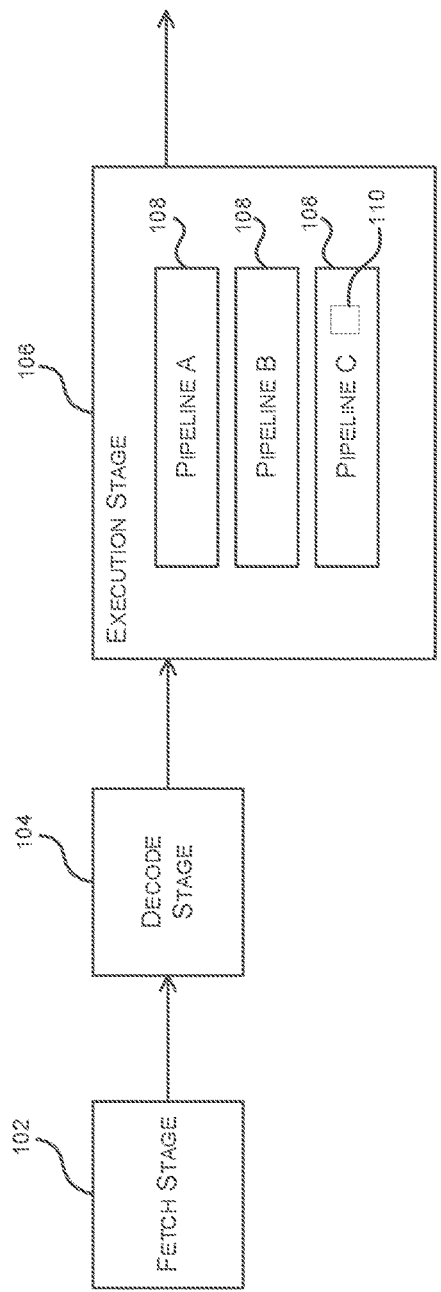
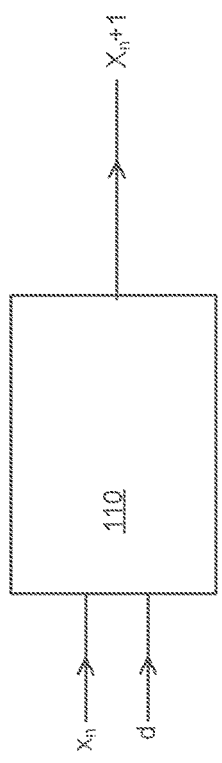
FIG 1A
FIG 1B

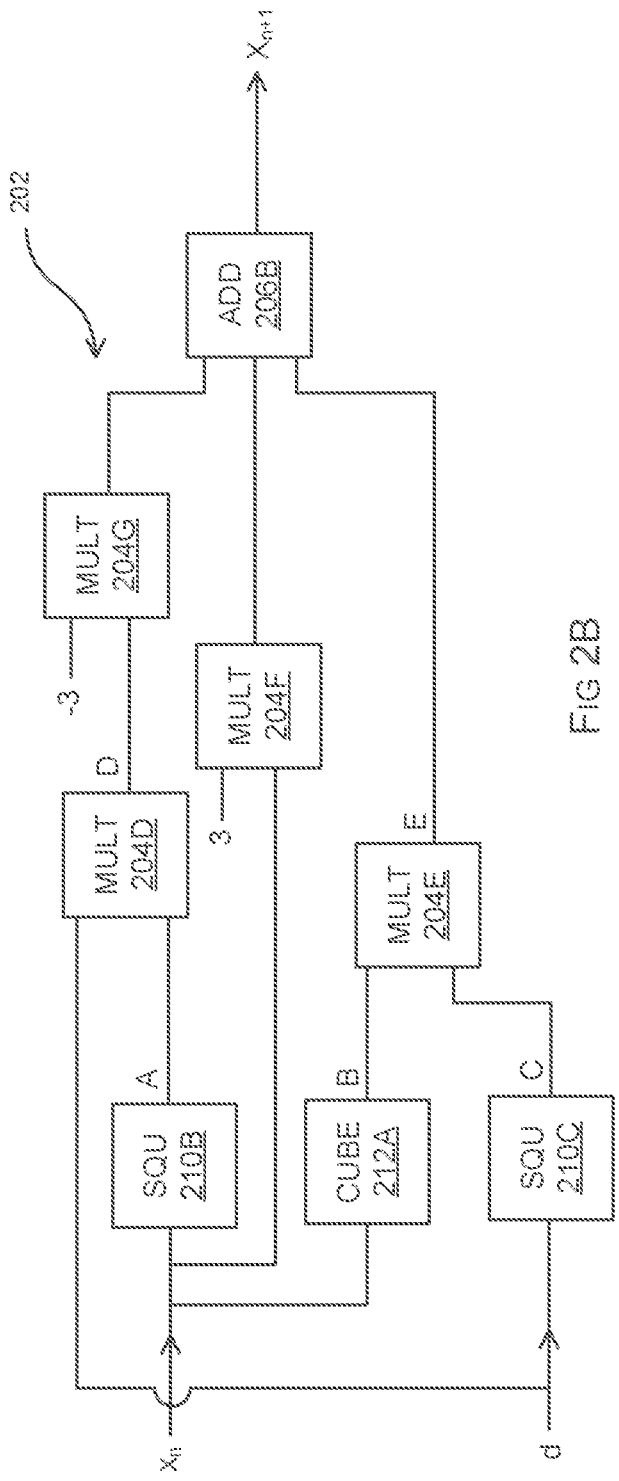
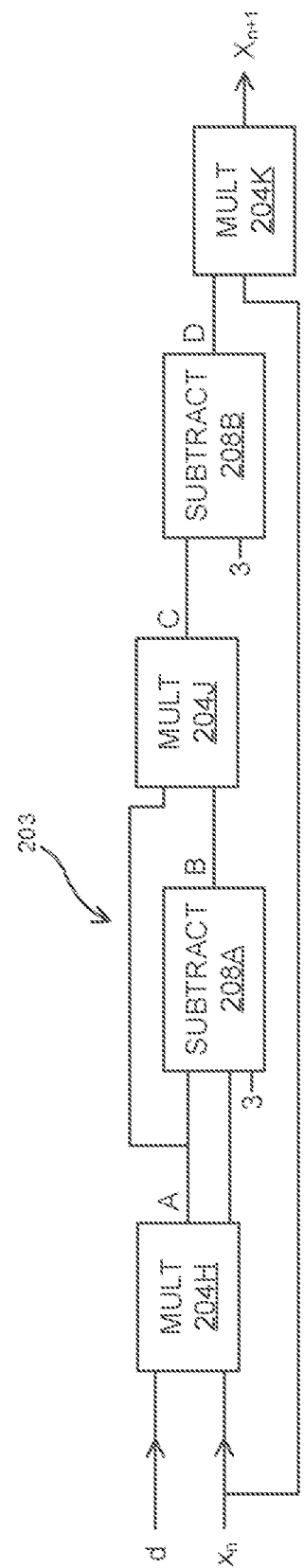
Fig 2B
Fig 2C

ITERATIVE ESTIMATION HARDWARE

CROSS-REFERENCE TO RELATED APPLICATIONS AND CLAIM OF PRIORITY

This application is a continuation under 35 U.S.C. 120 of application Ser. No. 16/725,378 filed Dec. 23, 2019, now U.S. Pat. No. 11,422,802, which claims foreign priority under 35 U.S.C. 119 from United Kingdom Application No. 1821179.7 filed Dec. 21, 2018.

BACKGROUND

There are many situations where hardware is required to evaluate a function of an input number, for example to evaluate the reciprocal of the input number, a trigonometric function or the square root of an input number. These are often evaluated using iterative methods which refine, in each iteration, an estimate of the function, to provide a more accurate estimate. Use of iterative methods enables the same hardware to be used for multiple iterations, thereby trading throughput for area of hardware.

The embodiments described below are provided by way of example only and are not limiting of implementations which solve any or all of the disadvantages of known iterative calculation hardware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A function estimation hardware logic unit is described. The function estimation hardware logic unit may be implemented as part of an execution pipeline in a processor. The function estimation hardware logic unit is arranged to calculate, in hardware logic, an improved estimate of a function of an input value, d, where the function is given by $$1/\sqrt[i]{d}.$$

The hardware logic comprises a plurality of multipliers and adders arranged to implement an $m^{th}$-order polynomial with coefficients that are rational numbers, where m is not equal to two and in various examples m is not equal to a power of two. In various examples i=1, i=2 or i=3. In various examples m=3 or m=4.

A first aspect provides a function estimation hardware logic unit for use in an arithmetic logic unit of a processor, the function estimation hardware logic arranged to calculate, in hardware logic, an improved estimate, $x_{n+1}$, for a function of an input value, d, wherein the function is $$1/\sqrt[i]{d},$$

and the hardware logic comprising: a first input arranged to receive the input value, d; a second input arranged to receive an estimate, $x_n$, for the function of the input value; and an output arranged to output the improved estimate, $x_{n+1}$, for the function of the input value; and a combination of multiplier and addition hardware blocks configured in hardware circuitry to implement an $m^{th}$-order polynomial to determine the improved estimate, $x_{n+1}$, with $m^{th}$ order convergence, wherein the $m^{th}$-order polynomial can be expressed as:

$$f_{i,m}(x,d) = x_{n+1} = x_n \left(\prod_{k=1}^{m-1}\left(1+\frac{1}{ki}\right)\right)\sum_{j=0}^{m-1}\binom{m-1}{j}\frac{(-dx_n^i)^j}{ji+1}$$

where i and m are natural numbers, wherein m>2, wherein $$\binom{m-1}{j}$$

is a binomial coefficient and is equal to zero if j>(m−1).

A second aspect provides a computer implemented method comprising calculate, in hardware logic, an improved estimate, $x_{n+1}$, for a function of an input value, d, wherein the function is $$1/\sqrt[i]{d},$$

and the method comprising: receiving the input value, d; receiving an estimate, $x_n$, for the function of the input value; and calculating an improved estimate, $x_{n+1}$, for the function of the input value by inputting the input value and the received estimate to a combination of multiplier and addition hardware blocks configured in hardware circuitry to implement an $m^{th}$-order polynomial to determine the improved estimate, $x_{n+1}$, with $m^{th}$ order convergence, wherein the $m^{th}$-order polynomial can be expressed as:

$$f_{i,m}(x,d) = x_{n+1} = x_n \left(\prod_{k=1}^{m-1}\left(1+\frac{1}{ki}\right)\right)\sum_{j=0}^{m-1}\binom{m-1}{j}\frac{(-dx_n^i)^j}{ji+1}$$

where i and m are natural numbers, wherein m>2, wherein $$\binom{m-1}{j}$$

is a binomial coefficient and is equal to zero if j>(m−1).

The methods described herein may be embodied in hardware on an integrated circuit. There may be provided a method of manufacturing, at an integrated circuit manufacturing system, a function estimation hardware logic unit. There may be provided an integrated circuit definition dataset that, when processed in an integrated circuit manufacturing system, configures the system to manufacture a function estimation hardware logic unit. There may be provided a non-transitory computer readable storage medium having stored thereon a computer readable description of an integrated circuit that, when processed, causes a layout processing system to generate a circuit layout description used in an integrated circuit manufacturing system to manufacture a function estimation hardware logic unit.

There may be provided an integrated circuit manufacturing system comprising: a non-transitory computer readable storage medium having stored thereon a computer readable integrated circuit description that describes the function estimation hardware logic unit; a layout processing system configured to process the integrated circuit description so as to generate a circuit layout description of an integrated circuit embodying the function estimation hardware logic unit; and an integrated circuit generation system configured to manufacture the function estimation hardware logic unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 1A shows a schematic diagram of an example processor;

FIGS. 1B, 1C and 1D show a part of an execution pipeline in FIG. 1A in more detail;

FIGS. 2A, 2B and 2C show three example function estimation hardware logic units;

Figure 1C:
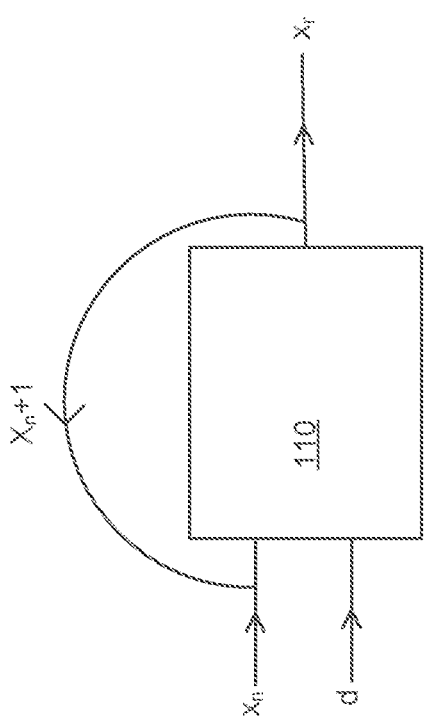

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

There are many situations where hardware logic, such as within an execution pipeline of a processor chip (e.g. a CPU or GPU), is required to evaluate a function of an input number, d, where the function is given by:

$$1/\sqrt[i]{d},$$

which may alternatively be written as $$d^{-\frac{1}{i}},$$

and i is an integer (and i≥1). The results of these functions are often irrational and so it is often not possible to provide an exact result in a given number format that is being used. In such examples, where a good, close, estimate is determined, this may be referred to as calculating a value (or result) of the function. In an example where i=1, the function is 1/d (i.e. the reciprocal of the input number), in an example where i=2, the function is $$1/\sqrt[2]{d}$$

(i.e. the reciprocal of the square root of the input number) and in an example where i=3, the function is $$1/\sqrt[3]{d}$$

(i.e. the reciprocal of the cube root of the input number). These functions (i.e. functions of the form $$\left(\text{i.e. functions of the form } d^{-\frac{1}{i}}\right)$$

are often evaluated using iterative methods which refine, in each iteration, an estimate of the function, to provide a more accurate estimate; however, each iteration that is performed results in rounding errors and these errors accumulate. Consequently, if the hardware converges more quickly, and hence less iterations are required to meet a pre-defined error bound, the rounding errors will be smaller (and hence the internal working of the CPU/GPU is improved) and where each iteration is implemented as a separate hardware block (to increase throughput compared to re-using one hardware block for multiple iterations) the resulting hardware logic will also be smaller and in various examples consume less power (again improving the internal working of the CPU/GPU).

A known method of refining an estimate of a function is the Newton-Raphson method. This method calculates an updated estimate $x_{n+1}$ from an existing estimate $x_n$ for finding the zeroes of a differentiable function $f(x)$, wherein:

$$x_{n+1} = x_n - \frac{f(x_n)}{f'(x_n)}$$

Where $f'(x)$ is the derivative of the function $f(x)$. If the function of the input number, d, that is to be calculated is the reciprocal, i.e. 1/d, then the function $f(x)$ can be set as:

$$f(x) = \frac{1}{x} - d$$

because this function has a zero at $$x = \frac{1}{d},$$

i.e.

$$f\left(\frac{1}{d}\right) = 0.$$

It follows that $$f'(x) = -\frac{1}{x^2}$$

and that:

$$x_{n+1} = x_n(2 - x_n d) = \frac{1}{d}\left(1 - (1 - x_n d)^2\right)$$

This method converges quadratically because if $$x_n = \frac{1}{d} - \varepsilon_n$$

(where $\varepsilon_n$ is the error value for estimate $x_n$) and $$x_{n+1} = \frac{1}{d} - \varepsilon_{n+1}:$$

$$\frac{1}{d} - \varepsilon_{n+1} = \frac{1}{d}\left(1 - \left(1 - d\left(\frac{1}{d} - \varepsilon_n\right)\right)^2\right)$$
$$\frac{1}{d} - \varepsilon_{n+1} = \frac{1}{d}(1 - (1 - (1 - d\varepsilon_n))^2)$$
$$\frac{1}{d} - \varepsilon_{n+1} = \frac{1}{d}(1 - (d\varepsilon_n)^2)$$
$$\frac{1}{d} - \varepsilon_{n+1} = \frac{1}{d} - d\varepsilon_n^2$$

$$\varepsilon_{n+1} = d\varepsilon_n^2$$

Described herein is hardware logic arranged to calculate an improved estimate of a function of an input value, d, where the function is given by $$d^{-\frac{1}{i}}(\text{or } 1/\sqrt[i]{d}).$$

The hardware comprises a plurality of multipliers and adders arranged to implement a $m^{th}$-order polynomial with coefficients that are rational numbers, where m is not equal to two and in various examples m is not equal to a power of two. In various examples i=1, i=2 or i=3 in combination with a value of m which is not equal to two or is not equal to a power of two. It will be appreciated that for any $m^{th}$-order polynomial with coefficients that are rational numbers, there are a finite number of different implementations using multipliers and adders, and any suitable arrangement of logic blocks may be used. In various examples m=3 or m=4.

Depending upon the implementation, a single iteration (i.e. a single pass through a single hardware logic block) may be sufficient. Alternatively, the hardware logic may be used to iteratively calculate an improved estimate of the function of the input value, either by multiple passes through the same hardware logic block where m is not equal to two or using multiple instances of the hardware logic block with the same or different value of m and wherein in at least one instance of the hardware logic block, m is not equal to two. The hardware logic may, for example, be implemented within a complex ALU (arithmetic logic unit) within an execution pipeline of a processor (e.g. a central processing unit, CPU).

Using the hardware logic described herein, the method converges more quickly than existing methods using the Newton-Raphson method, i.e. $m^{th}$ order convergence (where m≠2) compared to quadratic convergence in the case of the Newton-Raphson method. This means that the number of iterations that need to be performed to obtain a sufficiently accurate result (i.e. a result within a defined error bound) is reduced and in various examples a single iteration is sufficient. This reduces the rounding errors that are introduced and results in a more accurate result. In various examples, the final error (i.e. the difference between the estimate generated and the actual result, which as noted above, may be irrational) has a distribution that is centred around zero, instead of having a consistent bias in one direction (which would result in a consistent overestimate or a consistent underestimate). Additionally, where the iterations are implemented using separate instances of the hardware logic (e.g. within a complex ALU in a processor, such as a CPU), implementation of the method described herein in hardware logic, reduces the overall size of the hardware used to calculate the value (i.e. the estimate) of the function.

FIG. 1A shows a schematic diagram of an example processor 100 in which the methods described herein may be implemented. In this example the processor 100 is a single-threaded processor, however the methods are also applicable to multi-threaded processors.

The processor 100 comprises a fetch stage 102, a decode stage 104 and an execution stage 106. Further stages, such as for memory access and register write back, along with other function elements (e.g. caches, memory, register files, etc.) may also be included within the processor 100. The fetch stage 102 is configured to fetch instructions from a program (in program order) as indicated by a program counter (PC). Once an instruction is fetched it is provided to the decode stage 104 which is arranged to interpret the instructions. After an instruction passes through the decode stage 104 it is dispatched to the execution stage 106 for execution. The execution stage 106 may comprise multiple execution pipelines 108 and different instructions may be dispatched to different execution pipelines 108 dependent on the type of instruction. Each execution pipeline 108 is responsible for executing instructions and may be configured to execute specific types of instructions, e.g. a load-store pipeline, an integer execution pipeline, a floating point unit (FPU) pipeline, a digital signal processing (DSP)/single instruction multiple data (SIMD) pipeline, or a multiply accumulate (MAC) pipeline. The pipelines 108 have different lengths and/or complexities. The hardware logic described herein (referred to as a function estimation hardware logic unit 110) may be implemented within an ALU in an execution pipeline 108.

Figure 1D:
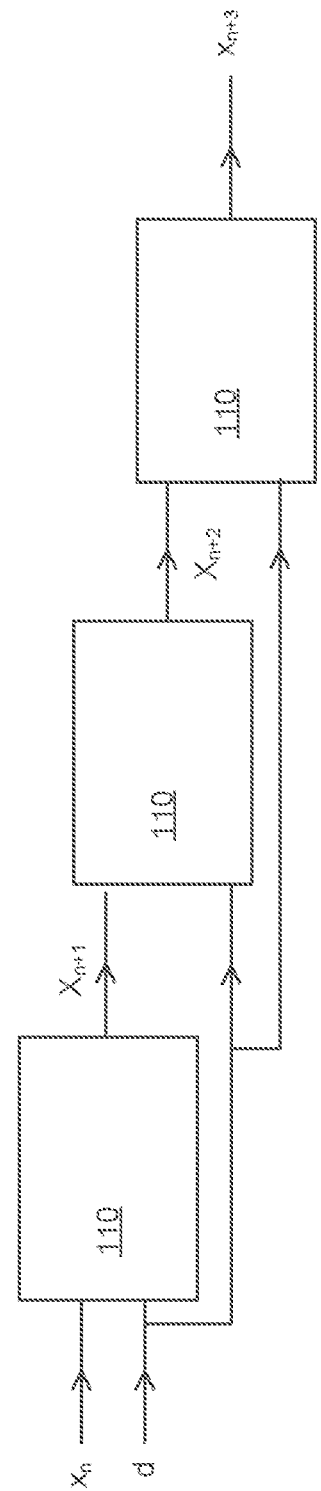

As shown in FIGS. 1B-1D, an execution pipeline 108 may comprise a single instance of the function estimation hardware logic unit 110 described herein (as shown in FIGS. 1B and 1C) or multiple instances of the function estimation hardware logic unit 110 described herein (as shown in FIG. 1D), with the result output by one instance being fed as an input into the next instance of the function estimation hardware logic unit 110. In examples where there is only a single instance, there may be a single pass through that instance (as shown in FIG. 1B) or multiple passes (as shown in FIG. 1C), with the result being output after a predefined number of iterations (e.g. r iterations) or when other criteria are satisfied. Examples of other criteria that may be used include, but are not limited to: iterating until an iteration is reached that does not result in any of the X most significant bits of the output changing, where X is an integer; iterating until another process is finished, where this other process may be a downstream component (such that the method is iterated until the component is ready to receive the output estimate) or a parallel process (e.g. where two different functions are being calculated in parallel and one, such as sin(x), takes much longer than the other, such as 1/x, that is estimated using the method described herein).

The function estimation hardware logic unit 110 (within an execution pipeline 108) described herein is arranged to calculate an improved estimate of a function of an input value, d, where the function is given by $$d^{-\frac{1}{i}} (\text{or } 1/\sqrt[i]{d})$$

and comprises hardware logic that implements a $m^{th}$-order polynomial for values of m which are not equal to two, as follows:

$$f_{i,m}(x, d) = x_{n+1} = x_n \left( \prod_{k=1}^{m-1} \left(1 + \frac{1}{ki}\right) \right) \sum_{j=0}^{m-1} \binom{m-1}{j} \frac{(-dx_n^i)^j}{ji+1} \quad (1a)$$

where $$\binom{m-1}{j}$$

is a binomial coefficient (i.e. the number of ways of picking j unordered outcomes from m−1 possibilities) and where the binomial coefficient is zero if j>(m−1).

Equation (1a) may alternatively be written as:

$$f_{i,m}(x, d) = x_{n+1} = x_n \sum_{j=0}^{m-1} \gamma_{j,m}(i) \cdot (-dx_n^i)^j \quad (1b)$$

with coefficients, $\gamma_{j,m}(i)$, that are rational numbers and where m is an integer and, as previously noted, is not equal to two, i.e. m≥3. The parameters m and i are natural numbers and are design parameters that are chosen for a particular implementation. The input value, d, may be a fixed point or floating point number.

The coefficients, $\gamma_{j,m}(i)$, in equation (1b) above are solutions to the equation:

$$\begin{pmatrix} 1 \\ 0 \\ \vdots \\ 0 \end{pmatrix} = \mathcal{M} \gamma \quad (2a)$$

where $\mathcal{M}$ is the Generalised Pascal Matrix with m×m entries, each entry being of the form $$\left( \binom{ji+1}{s} \right)_{j,s=0,1,\ldots,(m-1)}$$

where $$\binom{ji+1}{s}$$

is a binomial coefficient (i.e. the number of ways of picking s unordered outcomes from ji+1 possibilities) and where the binomial coefficient is zero if s>(ji+1), i.e.:

$$\mathcal{M} = \begin{pmatrix} \binom{1}{0} & \binom{i+1}{0} & \binom{2i+1}{0} & \cdots & \binom{(m-1)i+1}{0} \\ \binom{1}{1} & \binom{i+1}{1} & \binom{2i+1}{1} & \cdots & \binom{(m-1)i+1}{1} \\ 0 & \binom{i+1}{2} & \binom{2i+1}{2} & \cdots & \binom{(m-1)i+1}{2} \\ \vdots & \vdots & & \ddots & \vdots \\ 0 & \binom{i+1}{m-1} & \binom{2i+1}{m-1} & \cdots & \binom{(m-1)i+1}{m-1} \end{pmatrix}$$

This may be re-written such that the coefficients are given by:

$$\gamma_{j,m}(i) = \frac{\binom{m-1}{j} \prod_{\substack{k=0 \\ k \neq j}}^{m-1} (ki+1)}{i^{m-1}(m-1)!} \quad (2b)$$

Where $$\binom{m-1}{j}$$

is a binomial coefficient (i.e. the number of ways of picking j unordered outcomes from m−1 possibilities) and where the binomial coefficient is zero if j>(m−1).

The $m^{th}$-order polynomial of equation (1a) or (1b) provides $m^{th}$ order convergence:

$$\varepsilon_{n+1} = \theta(\varepsilon_n^m) \text{ as } \varepsilon_n \to 0$$

Figure 4:
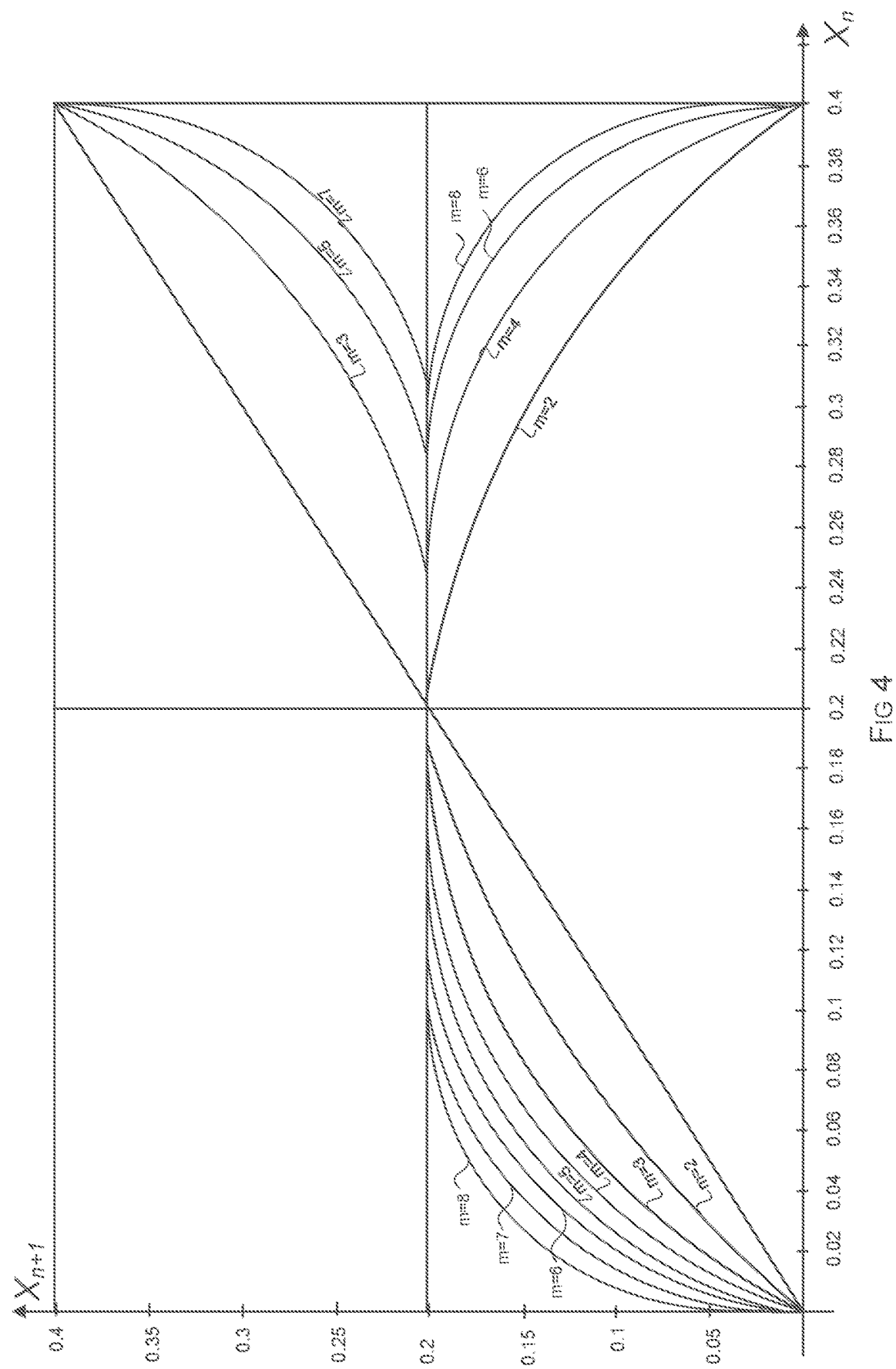
FIG. 4 is a graph showing the performance of the function estimation hardware logic units described herein.

As long as the initial guess, $x_0$, is:

$$x_0 \in \left( \frac{1 - \alpha(i, m)}{\sqrt[i]{d}}, \frac{1 + \beta(i, m)}{\sqrt[i]{d}} \right)$$

Where $\alpha(i, m)$, $\beta(i, m)$ are some values given i, m guaranteed to be greater than zero. A graph showing the convergence for d=5, i=1 and m=2,3,4,5,6,7,8 is shown in FIG. 4. In this graph, the x-axis is the value of $x_n$ and the y-axis is the value of $x_{n+1}$ and the error of $x_{n+1}$ for a given value of m is shown by the vertical distance from the line y=0.2 to the curve for that value of m. It can be clearly seen from this graph that where m>2, the convergence to $x_n=\frac{1}{5}$ is faster than where the Newton-Raphson method is used (which corresponds to the m=2 curve in FIG. 4) and the speed of convergence increases for increasing values of m. For example, for m=2 (i.e. using Newton-Raphson), $x_n=0.1$, the value of $x_{n+1}$ is around 0.14, an error of 0.06. For m=3 and $x_n=0.1$, the value of $x_{n+1}$ is around 0.16, a smaller error of around 0.04. Additionally, it can be seen that as a consequence of the faster convergence, the error in the estimate (i.e. $|0.2-x_{n+1}|$) is smaller.

The hardware logic 110 receives as input both the input number, d, and an estimate of the function, $x_n$ and outputs an updated, more accurate estimate of the function, $x_{n+1}$. In addition to the inputs and outputs, the hardware logic 110 comprises an arrangement of multipliers, adders and optionally shifters (e.g. right shifters) that may be arranged to implement the following operations: multiplication, addition, subtraction, square functions, cube functions and multiplication and division by powers of two. The $m^{th}$-order polynomial above (as in equation (1a) or (1b)) is implemented in hardware logic using a combination of some or all of these logic blocks and, as noted above, there are a finite number of different combinations of multipliers and adders that may be used (for any value of m), e.g. dependent upon the order in which the multiplications and additions are performed whilst still achieving the same overall result. The hardware logic 110 may comprise any combination of multipliers, adders and optionally other functional blocks that implement equation (1a) or (1b) or any functional equivalent of these equations. When implemented in hardware, the value of m may be selected to give a desired trade-off between area/delay and accuracy, with both the accuracy and area/delay increasing for larger values of m. As noted above, where there is a single hardware logic block that is used for all iterations, m is not equal to two, whereas where there are multiple hardware logic blocks that are used for different iteration, the value of m for at least one of the hardware logic blocks is not equal to two.

In various examples, the hardware logic 110 implements a $3^{rd}$ order polynomial (m=3):

$$f_{i,3}(x, d) = x_{n+1} = x_n \sum_{j=0}^{2} \gamma_{j,3}(i) \cdot \left(-dx_n^j\right)^j$$

where the coefficients $\gamma_{j,3}(i)$ are, using equations (2a) or (2b):

$$\gamma_{0,3} = 1 + \frac{3}{2i} + \frac{1}{2i^2}$$

$$\gamma_{1,3} = \frac{2}{i} + \frac{1}{i^2}$$

$$\gamma_{2,3} = \frac{1}{2i} + \frac{1}{2i^2}$$

In various examples, the hardware logic 110 implements an $m^{th}$ order polynomial where m>3. In other examples, the hardware logic 110 implements a $4^{th}$ order polynomial (m=4):

$$f_{i,4}(x, d) = x_{n+1} = x_n \sum_{j=0}^{3} \gamma_{j,4}(i) \cdot \left(-dx_n^j\right)^j$$

where the coefficients $\gamma_{j,3}(i)$ are, using equations (2a) or (2b):

$$\gamma_{0,4} = 1 + \frac{11}{6i} + \frac{1}{i^2} + \frac{1}{6i^3} = \frac{6i^3 + 11i^2 + 6i + 1}{6i^3}$$

$$\gamma_{1,4} = \frac{3}{i} + \frac{5}{2i^2} + \frac{1}{2i^3} = \frac{6i^2 + 5i + 1}{2i^3}$$

$$\gamma_{2,4} = \frac{3}{2i} + \frac{2}{i^2} + \frac{1}{2i^3} = \frac{3i^2 + 4i + 1}{2i^3}$$

$$\gamma_{3,4} = \frac{1}{3i} + \frac{1}{2i^2} + \frac{1}{6i^3} = \frac{2i^2 + 3i + 1}{6i^3}$$

In various examples, i=1, such that the function is given by 1/d (i.e. the function is the reciprocal of the input value) and the function estimation hardware logic unit comprises hardware logic arranged to implement the following $m^{th}$-order polynomial:

$$x_{n+1} = x_n \sum_{j=0}^{m-1} \binom{m}{j+1}(-dx_n)^j \quad (3)$$

Where, as described above, m≥3. This method provides $m^{th}$ order convergence.

In an example, if m=3, then using the $m^{th}$-order polynomial given above (equation 3):

$$x_{n+1} = x_n(3 - 3dx_n + d^2x_n^2) \quad (4)$$

Substituting $$x_{n+1} = \frac{1}{d} - \varepsilon_{n+1} \text{ and } x_n = \frac{1}{d} - \varepsilon_n$$

into equation (4) gives $\varepsilon_{n+1} = d^2\varepsilon_n^3$, which shows that for m=3 the method provides cubic convergence.

In various examples, i=3 and m≥3.

In various examples, i and m can have any combination of values except for the combination of i=2 and m=3.

Figure 2A:
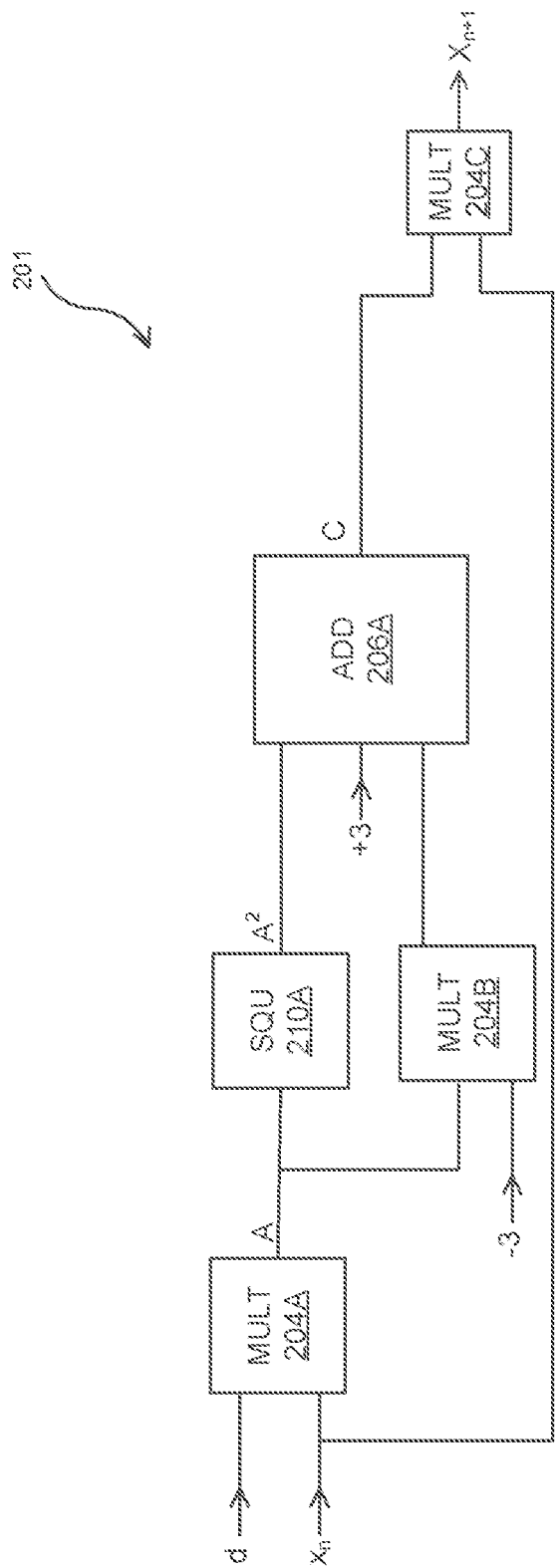

Three example hardware logic implementations of equation (4) are shown in FIGS. 2A-2C. In each example, the hardware logic 201-203 receives as input both the input number, d, and an estimate of the function, $x_n$ and outputs an updated, more accurate estimate of the function, $x_{n+1}$. In addition to the inputs and outputs, the hardware logic 201-203 comprises an arrangement of multipliers and adders arranged to implement the following operations: multiplication 204A-K, addition 206A-B, subtraction 208A-B, square functions 210A-C and cube functions 212A. As shown in FIGS. 2A-2C, multiplication and addition logic blocks may be merged into one array and so can be considered a single operation (e.g. in the form of a Fused Multiply Add).

In the first example hardware logic implementation 201, shown in FIG. 2A, a first hardware logic stage comprises a multiplier 204A and takes as inputs d and $x_n$ and outputs $dx_n$ (labelled A in FIG. 2A). A second hardware logic stage comprises a square function logic block 210A that takes as an input the output from the first hardware logic stage (multiplier 204A), $dx_n$, and outputs $d^2x_n^2$ (labelled A² in FIG. 2A). A third hardware logic stage comprises a multiplier 204B and an adder 206A and takes as input the outputs from both the first and second hardware logic stages and outputs $(3-3dx_n+d^2x_n^2)$ (labelled C in FIG. 2A). The fourth and final hardware logic stage comprises a multiplier 204C and takes as inputs the output from the third hardware logic stage and $x_n$ and outputs the result, $x_{n+1}$ (i.e. the more accurate estimate of the function). In this way, the logic shown in FIG. 2A is configured in hardware circuitry to implement equation (4), such that the inputs to the hardware circuitry are d and $x_n$, and the output, $x_{n+1}$, equals $x_n(3-3dx_n+d^2x_n^2)$.

In the second example hardware logic implementation 202, shown in FIG. 2B, a first hardware logic stage comprises a square function logic block 210B that takes as input $x_n$ and outputs $x_n^2$ (labelled A in FIG. 2B). A second hardware logic stage comprises a cube function logic block 212A that takes as input $x_n$ and outputs $x_n^3$ (labelled B in FIG. 2B). A third hardware logic stage comprises a square function logic block 210C that takes as input d and outputs $d^2$ (labelled C in FIG. 2B). A fourth hardware logic stage comprises a multiplier 204D and takes as inputs d and the output from the first hardware logic stage, $x_n^2$, and outputs $dx_n^2$ (labelled D in FIG. 2B). A fifth hardware logic stage comprises a multiplier 204E and takes as inputs the outputs from the second and third hardware logic stages and outputs $d^2x_n^3$ (labelled E in FIG. 2B). The sixth and final hardware logic stage comprises two multipliers 204F, 204G and an adder 206B and takes as inputs the outputs from the fourth and fifth hardware logic stages and $x_n$, and outputs the result, $x_{n+1}$ (i.e. the more accurate estimate of the function).

In the third example hardware logic implementation 203, shown in FIG. 2C, a first hardware logic stage comprises a multiplier 204H and takes as inputs d and $x_n$ and outputs $dx_n$ (labelled A in FIG. 2C). A second hardware logic stage comprises a subtraction logic block 208A (which may be implemented, for floating point inputs, using an adder and an inverter) that takes as an input the output from the first hardware logic stage, $dx_n$, and outputs $3-dx_n$ (labelled B in FIG. 2C). A third hardware logic stage comprises a multiplier 204J and takes as input the outputs from both the first and second hardware logic stages and outputs $dx_n(3-dx_n)$ (labelled C in FIG. 2C). A fourth hardware logic stage comprises a subtraction logic block 208B that takes as input the output from the third hardware logic stage and outputs $3-dx_n(3-dx_n)$ (labelled D in FIG. 2C). The fifth and final hardware logic stage comprises a multiplier 204K and takes as inputs the output from the fourth hardware logic stage and $x_n$ and outputs the result, $x_{n+1}$ (i.e. the more accurate estimate of the function).

In various examples, a single instance of hardware logic configured to implemented equation (4) above (e.g. as shown in any of FIGS. 2A-2C) may be used to generate an updated estimate in a single step instead of two instances or passes of the Newton-Raphson method. This results in a reduction in the rounding error as well as a reduction in the overall area of the hardware logic compared to two instances of identical hardware implementing Newton-Raphson.

In various examples, i=2, such that the function is given by $1/{}^2\sqrt{d}$ and if m=3, the function estimation hardware logic unit comprises hardware logic arranged to implement the following $3^{rd}$-order polynomial:

$$x_{n+1} = \frac{x_n}{8}(15 - dx_n^2(10 - 3dx_n^2)) \quad (5)$$

Figure 3A:
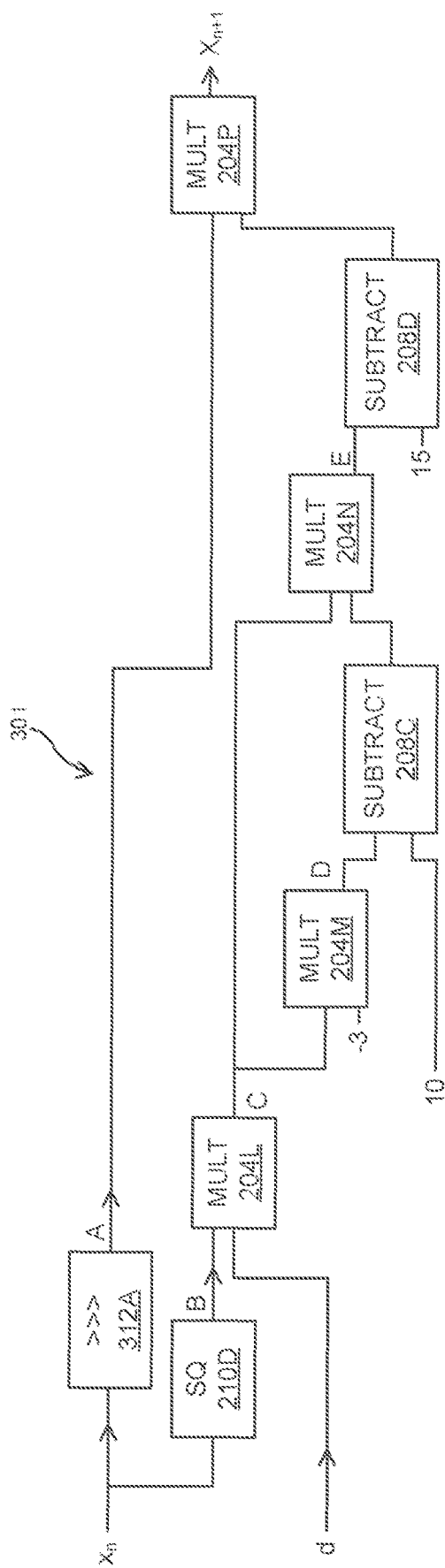
FIGS. 3A and 3B show two further example function estimation hardware logic units.
Figure 3B:
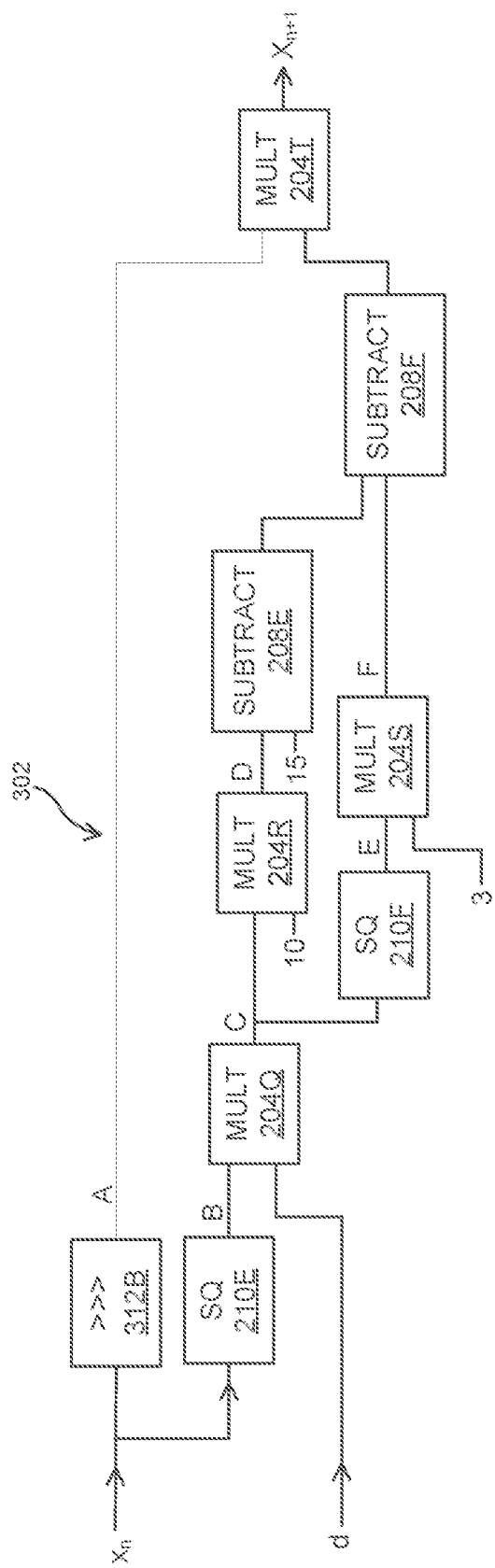

And two example hardware logic implementations are shown in FIGS. 3A and 3B. In each example, the hardware logic 301-302 receives as input both the input number, d, and an estimate of the function, $x_n$, and outputs an updated, more accurate estimate of the function, $x_{n+1}$. In addition to the inputs and outputs, the hardware logic 301-302 comprises an arrangement of multipliers, adders and right shifters arranged to implement the following operations: multiplication 204P-T, addition 206B, subtraction 208D-F, square functions 210D-F and division by eight 312B (i.e. right shifting by 3).

In the first example hardware logic implementation 301, shown in FIG. 3A, a first hardware logic stage comprises a right shifter 312A that takes as input $x_n$ and outputs $x_n/8$ (labelled A in FIG. 3A). A second hardware logic stage comprises a square function logic block 210D that takes as an input $x_n$ and outputs $x_n^2$ (labelled B in FIG. 3A). A third hardware logic stage comprises a multiplier 204L and takes as input d and the output from the second hardware logic stage and outputs $dx_n^2$ (labelled C in FIG. 3A). A fourth hardware logic stage comprises a multiplier 204M and takes as input the output from the third hardware logic stage and outputs $-3dx_n^2$ (labelled D in FIG. 3A). A fifth hardware logic stage comprises a subtraction logic block 208C and a multiplier 204N and takes as input the outputs from the third and fourth hardware logic stages and outputs $dx_n^2(10-3dx_n^2)$ (labelled E in FIG. 3A). The sixth and final hardware logic stage comprises a subtraction logic block 208D and a multiplier 204P and takes as inputs the outputs from the first and fifth hardware logic stage and outputs the result, $x_{n+1}$ (i.e. the more accurate estimate of the function).

In the second example hardware logic implementation 302, shown in FIG. 3B, a first hardware logic stage comprises a right shifter 312B that takes as input $x_n$ and outputs $x_n/8$ (labelled A in FIG. 3B). A second hardware logic stage comprises a square function logic block 210E that takes as an input $x_n$ and outputs $x_n^2$ (labelled B in FIG. 3B). A third hardware logic stage comprises a multiplier 204Q and takes as input d and the output from the second hardware logic stage and outputs $dx_n^2$ (labelled C in FIG. 3B). A fourth hardware logic stage comprises a multiplier 204R and takes as input the output from the third hardware logic stage and outputs $10dx_n^2$ (labelled D in FIG. 3A). A fifth hardware logic stage comprises a square function logic block 210F that takes as input the output from the third hardware logic stage and outputs $d^2x_n^2$ (labelled E in FIG. 3B). A sixth hardware logic stage comprises a multiplier 204S and takes as input the output from the fifth hardware logic stage and outputs $3d^2x_n^2$ (labelled F in FIG. 3B). The seventh and final hardware logic stage comprises two subtraction logic blocks 208E, 208F and a multiplier 204T and takes as inputs the outputs from the first, fourth and sixth hardware logic stage and outputs the result, $x_{n+1}$ (i.e. the more accurate estimate of the function).

The method of equation (5) is third order converging as shown below where $$x_n = \frac{1}{\sqrt[2]{d}} - \varepsilon_n$$

(where $\varepsilon_n$ is the error value for estimate $x_n$) and $$x_{n+1} = \frac{1}{\sqrt[3]{d}} - \varepsilon_{n+1};$$

$$\varepsilon_{n+1} = \frac{5d}{2}\varepsilon_n^3 - \frac{15d\sqrt{d}}{8}\varepsilon_n^4 + \frac{3d^2}{8}\varepsilon_n^5$$

So the $\varepsilon_n^3$ cubic term dominates for small $|\varepsilon_n|$ and will eventually converge to $$\frac{1}{\sqrt[3]{d}}$$

when the initial guess, $x_0$, is sufficiently close to $$\frac{1}{\sqrt[3]{d}}.$$

A first further example provides a function estimation hardware logic unit for use in an arithmetic logic unit of a processor, the function estimation hardware logic arranged to calculate, in hardware logic, an improved estimate, $x_{n+1}$, for a function of an input value, d, wherein the function is $$1/\sqrt[i]{d},$$

and the hardware logic comprising: a first input arranged to receive the input value, d; a second input arranged to receive an estimate, $x_n$, for the function of the input value; and an output arranged to output the improved estimate, $x_{n+1}$, for the function of the input value; and a combination of multiplier and addition hardware blocks configured in hardware circuitry to implement an $m^{th}$-order polynomial to determine the improved estimate, $x_{n+1}$, with $m^{th}$ order convergence, wherein the $m^{th}$-order polynomial can be expressed as:

$$f_{i,m}(x,d) = x_{n+1} = x_n\left(\prod_{k=1}^{m-1}\left(1+\frac{1}{ki}\right)\right)\sum_{j=0}^{m-1}\binom{m-1}{j}\frac{(-dx_n^i)^j}{ji+1}$$

where i and m are natural numbers, wherein m>2, wherein $$\binom{m-1}{j}$$

is a binomial coefficient and is equal to zero if $j>(m-1)$.

The value of m may be not equal to a power of two.
The value of m may be three.
The values of m and i may be any combination of values except for m=3 and i=2.
The value of m may be greater than three. The value of m may be four.
The value of i may be one, such that the $m^{th}$-order polynomial can be expressed as:

$$x_{n+1} = x_n\sum_{j=0}^{m-1}\binom{m}{j+1}(-dx_n)^j$$

The value of m may be three such that the $m^{th}$-order polynomial can be expressed as:

$$x_{n+1}=x_n(3-3dx_n+d^2x_n^2)$$

The combination of multiplier and addition hardware blocks configured in hardware circuitry to implement the $m^{th}$-order polynomial may comprise: a first hardware logic stage comprising a multiplier, the multiplier comprising a first input arranged to receive the input value, d, and a second input arranged to receive an estimate, $x_n$, for the function of the input value, and an output; a second hardware logic stage comprising a square function logic block, the square function logic block comprising an input connected to the output of the first hardware logic stage and an output; a third hardware logic stage comprising a multiplier and an adder and an output, the multiplier comprising an input connected to the output of the first hardware logic stage and an output and the adder comprising inputs connected to the outputs of the second hardware logic stage and the multiplier in the third hardware logic stage; and a fourth hardware logic stage comprising a multiplier and an output, the multiplier comprising a first input arranged to receive an estimate, $x_n$, for the function of the input value and a second input connected to the output of the third hardware stage.

The combination of multiplier and addition hardware blocks configured in hardware circuitry to implement the $m^{th}$-order polynomial may comprise: a first hardware logic stage comprising a square function logic block, the square function logic block comprising an input arranged to receive an estimate $x_n$ for the function of the input value and an output; a second hardware logic stage comprising a cube function logic block, the cube function logic block comprising an input arranged to receive an estimate $x_n$ for the function of the input value and an output; a third hardware logic stage comprising a square function logic block, the square function logic block comprising an input arranged to receive the input value, d, and an output; a fourth hardware logic stage comprising a multiplier, the multiplier comprising a first input arranged to receive the input value, d, a second input connected to the output from the first hardware logic stage and an output; a fifth hardware logic stage comprising a multiplier, the multiplier comprising inputs connected to the outputs of the second and third hardware logic stages and an output; and a sixth hardware logic stage comprising two multipliers, an adder and an output, wherein a first of the two multipliers comprises an input arranged to receive an estimate $x_n$ for the function of the input value and an output, a second of the two multipliers comprises an input connected to the output from the fourth hardware logic stage and an output, and the adder comprises inputs connected to the outputs of the two multipliers in the sixth hardware logic stage and to the output of the fifth hardware logic stage.

The combination of multiplier and addition hardware blocks configured in hardware circuitry to implement the $m^{th}$-order polynomial may comprise: a first hardware logic stage comprising a multiplier, the multiplier comprising an input arranged to receive the input value, d and an input arranged to receive an estimate $x_n$ for the function of the input value and an output; a second hardware logic stage comprising a subtraction logic block, the subtraction logic block comprising an input connected to the output of the first hardware logic stage and an output; a third hardware logic stage comprising a multiplier, the multiplier comprising an input connected to the output of the first hardware logic stage, an input connected to the output of the second hardware logic stage and an output; a fourth hardware logic stage comprising a subtraction logic block, the subtraction logic block comprising an input connected to the output of the third hardware logic stage and an output; and a fifth hardware logic stage comprising a multiplier, the multiplier comprising an input connected to the output of the fourth hardware logic stage, an input arranged to receive an estimate $x_n$ and an output.

The value of m may be three and the value of i may be two, such that the $m^{th}$-order polynomial can be expressed as:

$$x_{n+1} = \frac{x_n}{8}(15 - dx_n^2(10 - 3dx_n^2))$$

The combination of multiplier and addition hardware blocks configured in hardware circuitry to implement the $m^{th}$-order polynomial may comprise: a first hardware logic stage comprising a right shifter, the right shifter comprising an input arranged to receive an estimate $x_n$ for the function of the input value and an output; a second hardware logic stage comprising a square function logic block, the square function logic block comprising an input arranged to receive an estimate $x_n$ for the function of the input value and an output; a third hardware logic stage comprising a multiplier, the multiplier comprising an input arranged to receive the input value, d, an input connected to the output of the second hardware logic stage and an output; a fourth hardware logic stage comprising a multiplier, the multiplier comprising an input connected to the output of the third hardware logic stage and an output; a fifth hardware logic stage comprising a subtraction logic block and a multiplier, the subtraction logic block comprising an input connected to the output of the fourth hardware logic stage and an output and the multiplier comprising an input connected to the output of the subtraction logic block, an input connected to the output of the third hardware logic stage and an output; and a sixth hardware logic stage comprising a subtraction logic block and a multiplier, the subtraction logic block comprising an input connected to the output of the fifth hardware logic stage and an output and the multiplier comprising an input connected to the output of the subtraction logic block, an input connected to the output of the first hardware logic stage and an output.

The combination of multiplier and addition hardware blocks configured in hardware circuitry to implement the $m^{th}$-order polynomial may comprise: a first hardware logic stage comprising a right shifter, the right shifter comprising an input arranged to receive an estimate $x_n$ for the function of the input value and an output; a second hardware logic stage comprising a square function logic block, the square function logic block comprising an input arranged to receive an estimate $x_n$ for the function of the input value and an output; a third hardware logic stage comprising a multiplier, the multiplier comprising an input arranged to receive the input value, d, an input connected to the output of the second hardware logic stage and an output; a fourth hardware logic stage comprising a multiplier, the multiplier comprising an input connected to the output of the third hardware logic stage and an output; a fifth hardware logic stage comprising a square function logic block, the square function logic block comprising an input connected to the output of the third hardware logic stage and an output; a sixth hardware logic stage comprising a multiplier, the multiplier compris-ing an input connected to the output of the fifth hardware logic stage and an output; and a seventh hardware logic stage comprising two subtraction logic blocks and a multiplier, the first of the two subtraction logic blocks comprising an input connected to the output of the fourth hardware logic stage and an output, the second of the two subtraction logic blocks comprising an input connected to the output of the first of the two subtraction logic blocks, an input connected to the output of the sixth hardware logic stage and an output and the multiplier comprising an input connected to the output of the first hardware logic stage, an input connected to the output of the second of the two subtraction logic blocks and an output.

A second further example provides an arithmetic logic unit comprising a function estimation hardware logic unit as described herein.

A third further example provides an arithmetic logic unit comprising plurality of instances of the function estimation hardware logic unit as described herein arranged in a sequence, wherein an output from one function estimation hardware logic unit is taken as an input to a next function estimation hardware logic unit in the sequence.

A fourth further example provides a processor comprising the arithmetic logic unit as described herein.

A fifth further example provides a computer implemented method comprising calculate, in hardware logic, an improved estimate, $x_{n+1}$, for a function of an input value, d, wherein the function is $$1/\sqrt[i]{d},$$

and the method comprising: receiving the input value, d; receiving an estimate, $x_n$, for the function of the input value; and calculating an improved estimate, $x_{n+1}$, for the function of the input value by inputting the input value and the received estimate to a combination of multiplier and addition hardware blocks configured in hardware circuitry to implement an $m^{th}$-order polynomial to determine the improved estimate, $x_{n+1}$, with $m^{th}$ order convergence, wherein the $m^{th}$-order polynomial can be expressed as:

$$f_{i,m}(x,d) = x_{n+1} = x_n \left(\prod_{k=1}^{m-1}\left(1+\frac{1}{ki}\right)\right)\sum_{j=0}^{m-1}\binom{m-1}{j}\frac{(-dx_n^i)^j}{ji+1}$$

where i and m are natural numbers, wherein m>2, wherein $$\binom{m-1}{j}$$

is a binomial coefficient and is equal to zero if j>(m−1).

In the method, the value of i may be one, such that the $m^{th}$-order polynomial can be expressed as:

$$x_{n+1} = x_n \sum_{j=0}^{m-1}\binom{m}{j+1}(-dx_n)^j$$

In the method, the value of i may be one and the value of m may be three, such that the $m^{th}$-order polynomial can be expressed as:

$$x_{n+1}=x_n(3-3dx_n+d^2x_n^2)$$

In the method, the value of i may be two and the value of m may be three, such that the $m^{th}$-order polynomial can be expressed as:

$$x_{n+1} = \frac{x_n}{8}\left(15 - dx_n^2(10 - 3dx_n^2)\right).$$

A sixth further example provides an arithmetic logic unit configured to perform the method as described herein.

The arithmetic logic unit described herein may be embodied in hardware on an integrated circuit.

A seventh further example provides computer readable code configured to cause the method as described herein to be performed when the code is run. The computer readable code may be encoded on a computer readable storage medium.

Figure 5:
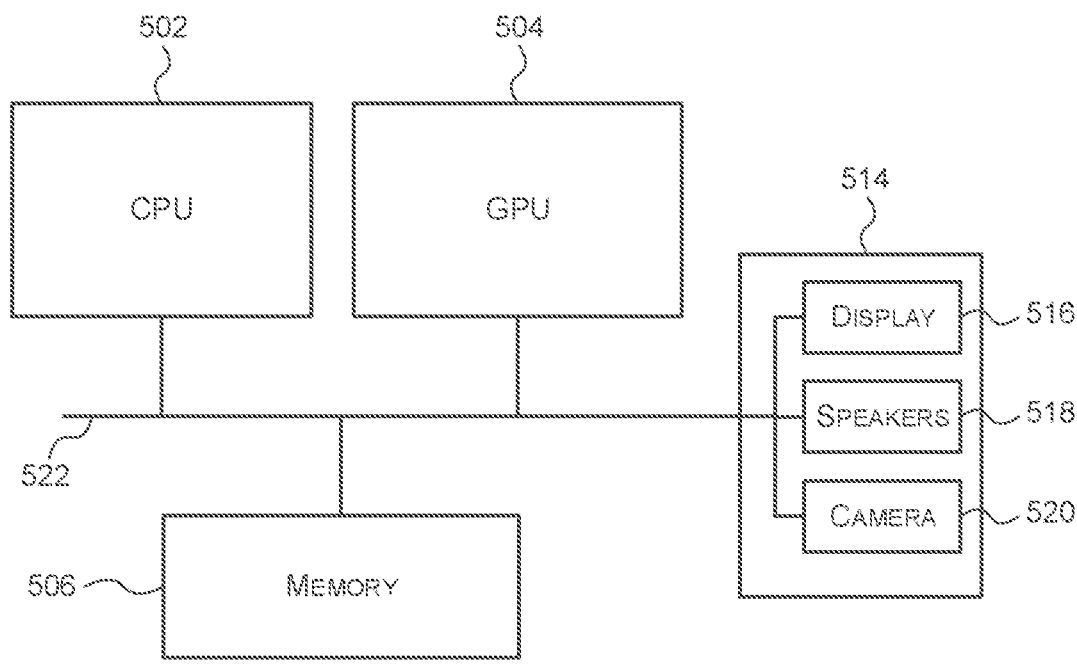
FIG. 5 shows a computer system in which a graphics processing system is implemented.

The methods described above may be implemented in hardware (e.g. within a function estimation hardware logic unit) or software. FIG. 5 shows a computer system in which the methods described herein may be implemented, e.g. within the central processing unit (CPU) 502 or graphics processing unit (GPU) 504. As shown in FIG. 5, the computer system further comprises a memory 506 and other devices 514, such as a display 516, speakers 518 and a camera 520. The components of the computer system can communicate with each other via a communications bus 522.

The function estimation hardware logic units of FIGS. 2A-3B are shown as comprising a number of functional blocks. This is schematic only and is not intended to define a strict division between different logic elements of such entities. Each functional block may be provided in any suitable manner. It is to be understood that intermediate values described herein as being formed by a hardware logic block need not be physically generated by the function estimation hardware logic unit at any point and may merely represent logical values which conveniently describe the processing performed by the function estimation hardware logic unit between its input and output.

The function estimation hardware logic units described herein may be embodied in hardware on an integrated circuit. The function estimation hardware logic unit s described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a function estimation hardware logic unit configured to perform any of the methods described herein, or to manufacture a function estimation hardware logic unit comprising any apparatus described herein. An integrated circuit definition dataset may be, for example, an integrated circuit description.

Therefore, there may be provided a method of manufacturing, at an integrated circuit manufacturing system, a function estimation hardware logic unit as described herein. Furthermore, there may be provided an integrated circuit definition dataset that, when processed in an integrated circuit manufacturing system, causes the method of manufacturing a function estimation hardware logic unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a function estimation hardware logic unit will now be described with respect to FIG. 6.

Figure 6:
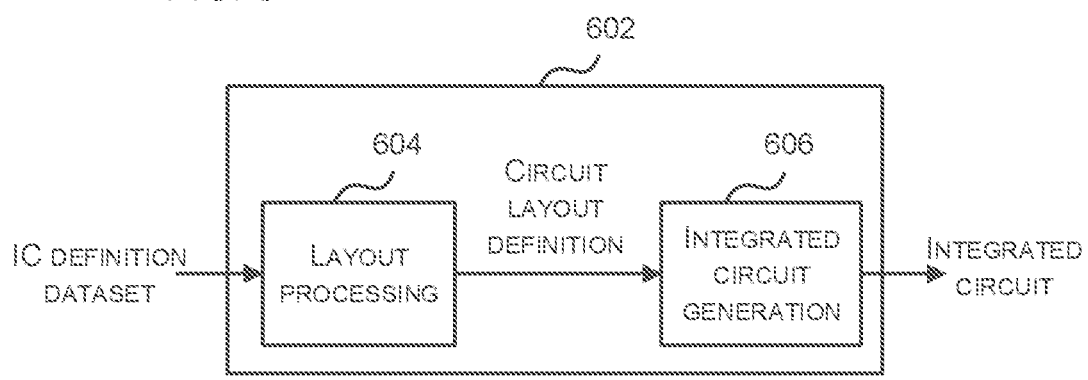
FIG. 6 shows an integrated circuit manufacturing system for generating an integrated circuit embodying a graphics processing system.

FIG. 6 shows an example of an integrated circuit (IC) manufacturing system 602 which is configured to manufacture a function estimation hardware logic unit as described in any of the examples herein. In particular, the IC manufacturing system 602 comprises a layout processing system 604 and an integrated circuit generation system 606. The IC manufacturing system 602 is configured to receive an IC definition dataset (e.g. defining a function estimation hardware logic unit as described in any of the examples herein), process the IC definition dataset, and generate an IC according to the IC definition dataset (e.g. which embodies a function estimation hardware logic unit as described in any of the examples herein). The processing of the IC definition dataset configures the IC manufacturing system 602 to manufacture an integrated circuit embodying a function estimation hardware logic unit as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 1006 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a function estimation hardware logic unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG., the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An arithmetic logic unit (ALU) of a processor, comprising a fixed function estimation hardware logic unit, the fixed function estimation hardware logic unit arranged to calculate, in fixed function hardware logic, an improved estimate, $x_{n+1}$, for a function of an input value, d, wherein the function is $$1/\sqrt[4]{d},$$

and the fixed function hardware logic comprising:
  a combination of multiplier and adder hardware blocks comprising:
    a first hardware logic stage comprising a multiplier, the multiplier comprising a first input arranged to receive the input value, d, a second input arranged to receive an estimate, $x_n$, for the function of the input value, and an output;
    a second hardware logic stage comprising a square function logic block, the square function logic block comprising an input connected to the output of the first hardware logic stage and an output;
    a third hardware logic stage comprising a multiplier and an adder and an output, the multiplier in the third hardware logic stage comprising an input connected to the output of the first hardware logic stage and an output and the adder comprising inputs connected to the outputs of the second hardware logic stage and the multiplier in the third hardware logic stage;

a fourth hardware logic stage comprising a multiplier comprising a first input arranged to receive an estimate, $x_n$, for the function of the input value and a second input connected to the output of the third hardware logic stage; and an output arranged to output the improved estimate, $x_{n+1}$, for the function of the input value;

wherein the combination of multiplier and adder hardware blocks is configured in hardware circuitry to implement an $m^{th}$-order polynomial to determine the improved estimate, $x_{n+1}$, with $m^{th}$ order convergence, wherein the $m^{th}$-order polynomial can be expressed as:

$$f_{i,m}(x,d)_\square = x_{n+1} = x_n \left(\prod_{k=1}^{m-1}\left(1+\frac{1}{ki}\right)\right)\sum_{j=0}^{m-1}\binom{m-1}{j}\frac{(-dx_n^i)^j}{ji+1}$$

where i and m are natural numbers, wherein m>2, wherein $$\binom{m-1}{j}$$

is a binomial coefficient and is equal to zero if j>(m−1), and wherein m and i have any combination of values except for m=3 and i=2.

2. The ALU according to claim 1, wherein m is not equal to a power of two.

3. The ALU according to claim 1, wherein m=3.

4. The ALU according to claim 1, wherein m>3.

5. The ALU according to claim 1, wherein m=4.

6. The ALU according to claim 1, wherein i=1, such that the $m^{th}$-order polynomial can be expressed as:

$$x_{n+1} = x_n \sum_{j=0}^{m-1} \binom{m}{j+1}(-dx_n)^j.$$

7. The ALU according to claim 6, wherein m=3, such that the $m^{th}$-order polynomial can be expressed as:

$$x_{n+1} = x_n(3-3dx_n+d^2x_n^2).$$

8. The ALU according to claim 1, comprising a plurality of instances of the fixed function estimation hardware logic units arranged in a sequence, wherein an output from one fixed function estimation hardware logic unit is taken as an input to a next fixed function estimation hardware logic unit in the sequence.

9. A computer implemented method for calculating, in an arithmetic logic unit (ALU) of a processor, comprising a fixed function estimation hardware logic unit, an improved estimate, $x_{n+1}$, for a function of an input value, d, wherein the function is $$1/\sqrt[i]{d},$$

and the method comprising:

receiving the input value, d, at a first input of a multiplier in a first hardware logic stage and receiving an estimate, $x_n$, for the function of the input value at a second input of the multiplier in the first hardware logic stage;

receiving an output from the multiplier in the first hardware logic stage at an input of a square function logic block in a second hardware logic stage;

receiving the output from the multiplier in the first hardware logic stage at a multiplier in a third hardware logic stage;

receiving an output from the square function logic block in the second hardware logic stage and an output from the multiplier in the third hardware logic stage at an adder in the third hardware logic stage;

receiving the estimate, $x_n$, for the function of the input value and an output from the adder in the third hardware logic stage at a multiplier in the fourth hardware logic stage; and outputting at the fourth hardware logic stage an improved estimate, $x_{n+1}$, for the function of the input value by inputting the input value and the received estimate to a combination of multiplier and addition hardware blocks configured in hardware circuitry to implement an $m^{th}$-order polynomial to determine the improved estimate, $x_{n+1}$, with $m^{th}$ order convergence, wherein the $m^{th}$-order polynomial can be expressed as:

$$f_{i,m}(x,d)_\square = x_{n+1} = x_n \left(\prod_{k=1}^{m-1}\left(1+\frac{1}{ki}\right)\right)\sum_{j=0}^{m-1}\binom{m-1}{j}\frac{(-dx_n^i)^j}{ji+1}$$

where i and m are natural numbers, wherein m>2, wherein $$\binom{m-1}{j}$$

is a binomial coefficient and is equal to zero if j>(m−1), and wherein m and i have any combination of values except for m=3 and i=2.

10. The method according to claim 9, wherein:
(a) i=1, such that the $m^{th}$-order polynomial can be expressed as:

$$x_{n+1} = x_n \sum_{j=0}^{m-1} \binom{m}{j+1}(-dx_n)^j$$

or
(b) i=1 and m=3, such that the $m^{th}$-order polynomial can be expressed as:

$$x_{n+1} = x_n(3-3dx_n+d^2x_n^2)$$

or
(c) i=3;
or
(d) m>3;
or
(e) m=4.

11. A non-transitory computer readable storage medium having stored thereon an integrated circuit definition dataset that, when processed in an integrated circuit manufacturing system, configures the integrated circuit manufacturing system to manufacture an arithmetic logic unit (ALU) of a processor, comprising a fixed function estimation hardware logic unit, the fixed function estimation hardware logic unit arranged to calculate, in fixed function hardware logic, an improved estimate, $x_{n+1}$, for a function of an input value, d, wherein the function is $1/\sqrt[i]{d}$, and the fixed function hardware logic comprising:
a combination of multiplier and adder hardware blocks comprising:
a first hardware logic stage comprising a multiplier, the multiplier comprising a first input arranged to receive the input value, d, and a second input arranged to receive an estimate, $x_n$, for the function of the input value;
a second hardware logic stage comprising a square function logic block, the square function logic block comprising an input connected to an output of the first hardware logic stage and an output;
a third hardware logic stage comprising a multiplier and an adder and an output, the multiplier in the third hardware logic stage comprising an input connected to the output of the first hardware logic stage and an output and the adder comprising inputs connected to the outputs of the second hardware logic stage and the multiplier in the third hardware logic stage;
a fourth hardware logic stage comprising a multiplier comprising a first input arranged to receive an estimate, $x_n$, for the function of the input value and a second input connected to the output of the third hardware logic stage; and
an output arranged to output the improved estimate, $x_{n+1}$, for the function of the input value;
wherein the combination of multiplier and adder hardware blocks configured in hardware circuitry to implement an mth-order polynomial to determine the improved estimate, $x_{n+1}$, with $m^{th}$ order convergence, wherein the $m^{th}$-order polynomial can be expressed as:

$$f_{i,m}(x, d)_\square = x_{n+1} = x_n \left( \prod_{k=1}^{m-1} \left(1 + \frac{1}{ki}\right) \right) \sum_{j=0}^{m-1} \binom{m-1}{j} \frac{(-dx_n^i)^j}{ji+1}$$

where i and m are natural numbers, wherein m>2, wherein $$\binom{m-1}{j}$$

is a binomial coefficient and is equal to zero if j>(m−1), and wherein m and i have any combination of values except for m=3 and i=2.

* * * * *